United States Patent

Lynum et al.

[11] Patent Number: 5,997,837
[45] Date of Patent: Dec. 7, 1999

[54] METHOD FOR DECOMPOSITION OF HYDROCARBONS

[75] Inventors: Steinar Lynum; Kjell Haugsten, both of Oslo; Ketil Hox, Trondheim; Jan Hugdahl, Trondheim; Nils Myklebust, Trondheim, all of Norway

[73] Assignee: Kvaerner Technology and Research Ltd., London, United Kingdom

[21] Appl. No.: 08/769,344

[22] Filed: Dec. 19, 1996

Related U.S. Application Data

[63] Continuation of application No. 08/244,296, filed as application No. PCT/NO92/00196, Dec. 11, 1992, abandoned.

[30] Foreign Application Priority Data

Dec. 12, 1991 [NO] Norway ..................................... 914904

[51] Int. Cl.$^6$ ....................................................... C09C 1/48
[52] U.S. Cl. ............................................ 423/450; 423/458
[58] Field of Search ................................... 423/450, 458; 422/150; 219/121.51, 121.52

[56] References Cited

U.S. PATENT DOCUMENTS

| | | | |
|---|---|---|---|
| 3,342,554 | 9/1967 | Jordan et al. ........................ | 423/449.1 |
| 3,420,632 | 1/1969 | Ryan ...................................... | 423/450 |
| 4,101,639 | 7/1978 | Surovikin et al. ..................... | 423/450 |
| 5,090,340 | 2/1992 | Burgess ................................ | 219/121.51 |
| 5,227,603 | 7/1993 | Doolette et al. ..................... | 219/121.52 |

FOREIGN PATENT DOCUMENTS

| | | | |
|---|---|---|---|
| 2562902 | 10/1985 | France .................................... | 423/458 |
| 3101289 | 12/1981 | Germany . | |
| 211457 | 7/1984 | Germany . | |
| 292920 | 8/1991 | Germany . | |
| 1400266 | 7/1975 | United Kingdom ................... | 423/450 |

*Primary Examiner*—Michael Lewis
*Assistant Examiner*—Stuart L. Hendrickson
*Attorney, Agent, or Firm*—W. Warren Taltavull; Farkas & Manelli PLLC

[57] ABSTRACT

In a method for decomposition of hydrocarbons for the production of hydrogen and carbon black, the feed stock is passed through a plasma torch, which causes a pyrolytic decomposition of the feed stock. The feed stock is transported through the plasma torch (A) in a cooled lead-in tube (1) and undergoes a first heating in an area in the immediate vicinity of the plasma flame. The material thereby produced is passed on to one or more subsequent stages where the final and complete decomposition of the hydrocarbons to carbon black and hydrogen occurs. In this area further raw material may be added which causes quenching and reacts with the already produced carbon black. An increase is thereby caused in particle size, density and amount produced without further energy supply, whereafter the products produced are expelled and separated and hot gas may be transported in a return pipe to the torch, in order to further increase the energy yield.

5 Claims, 1 Drawing Sheet

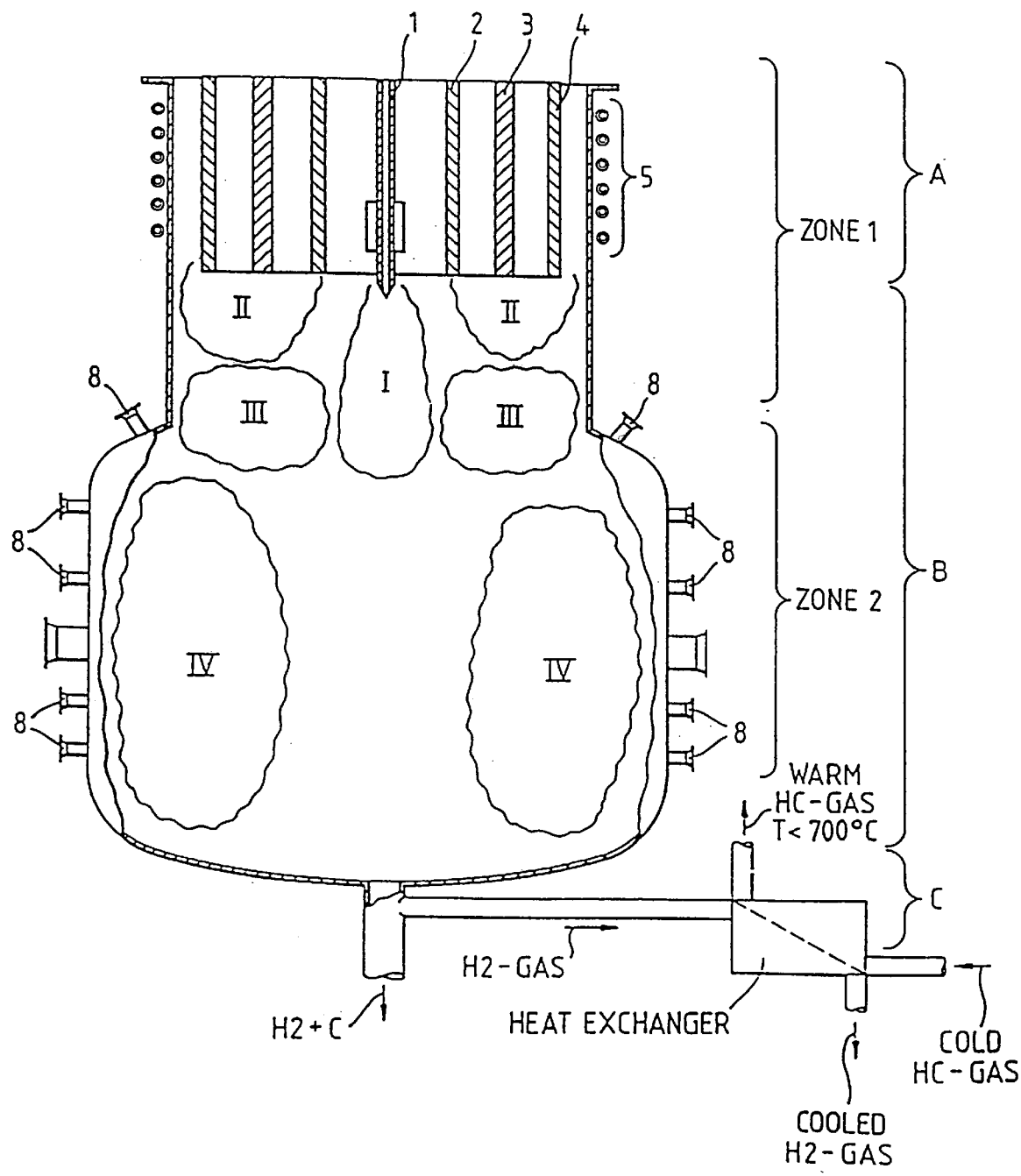

METHOD FOR DECOMPOSITION OF HYDROCARBONS

This is a continuation of Application Ser. No. 08/244,296, filed on Dec. 21, 1994, which was abandoned upon the filing hereof which is a 371 of PCT/NO92/00196 filed Dec. 11, 1992.

FIELD OF THE INVENTION

The invention concerns a method for decomposition of hydrocarbons for the production of hydrogen and carbon black, the method employing a pyrolytic process with a torch in a reaction chamber.

BACKGROUND OF THE INVENTION

The traditional production methods for carbon black consist in a combustion of hydrocarbons by the supply of air. The quality achieved will be dependent on the supply of air or oxygen and the use of different amounts of oxygen in a surplus or a deficit. In the known methods substantial parts of the hydrocarbons are consumed in supplying sufficient energy for the decomposition, thus realizing a relatively low yield of carbon black. In addition to a low yield the combustion process will cause environmental pollution, since both carbon dioxides and nitrogen oxides will be produced. The waste gases from the processes will be able to be used only as fuel gas.

For the decomposition of hydrocarbons other pyrolytic methods have also been used in which plasma torches have been utilized, but it has not been possible to use these methods for continuous production due to deposits on the electrodes, which have led to stoppages in the process and expensive cleaning procedures.

Carbon which is formed by pyrolysis of hydrocarbons can be divided into two different qualities, viz. carbon black and coke (pyrolytic carbon). Carbon black is light and soft with low density and is produced in the gas phase, while coke is harder, has high density and is produced on surfaces with relatively low temperatures, normally lower than 1100° C.

From U.S. Pat. No. 4,101,639 is known a pyrolytic method for the production of carbon black where water vapour is injected into the plasma stream radially and tangentially with respect to the walls of the reaction chamber. The water vapour will avoid the formation of pyrolytic carbon and graphite in the carbon black.

The tangential stream of water vapour will protect the walls of the reaction chamber from high temperatures of the plasma stream and prevent deposition of condensed carbon on the walls. The water will however decompose and create oxygen containing groups on the carbon black surface and is this considered a disadvantage for most qualities of carbon black. Furthermore the water will decompose and create oxygen containing gases such as carbonoxides and nitrogenoxides which will pollute the off-gases in the process.

From DD 211 457 is known a method and an apparatus for the production of carbon black and hydrogen. A part of the hydrogen is recycled and is used as plasma gas. Feed stock in the form of hydrocarbons as liquid or gas is introduced radially via nozzles in one end of the reaction chamber and is mixed into a plasma stream at a temperature between 3500 K and 4000 K. The reaction chamber is equipped with tempering zones where the reaction products are quenched to a temperature of about 1100 K. The tempering zones in addition act as a heat exchanger and are used to preheat both the plasma gas and the feed stock. The disadvantage of the above method and apparatus is that the reaction chamber walls are cooled and thereby large temperature gradients arise in the reaction chamber in the area where the quenching of the feed stock occurs and uneven process condition and product qualities will be the result. In addition, deposition easily forms on cooled surfaces.

SUMMARY OF THE INVENTION

The object of the present invention is to provide an improved method for the decomposition of hydrocarbons by pyrolysis without the supply of extra energy and without the use of materials or gases which pollute the decomposition products. A further object of the invention is to provide a method which can be implemented continuously without stoppages for cleaning of the apparatus, while at the same time the raw materials should be able to be converted as completely as possible into the desired product.

A further object of the invention is to provide a method wherein the quality of the products obtained should be able to be extensively controlled and checked.

A final object of the invention is to provide a method by means of which the method can be implemented without pollution of the environment.

The invention also comprises an apparatus which can be used for the implementation of such a method.

BRIEF DESCRIPTION OF THE DRAWING

The single FIGURE is a schematic illustration of the apparatus of the present invention.

DETAILED DESCRIPTION OF THE INVENTION

The above-mentioned objects are achieved by a method and an apparatus which are characterized by the features in the patent claims presented.

The invention is primarily intended for the production of hydrogen and carbon black, in that the quality and degree of density of the carbon black component should be able to be controlled as required.

It is surprisingly found that when further raw material is added to one or more zones in the reaction chamber, it is possible to obtain a quenching of the dehydrogenated carbon material in the form of drops of liquid, and in addition a controlled growth or increase of the particle size and density of the produced carbon black is attained. In addition the reaction chamber is equipped with extra plasma torches which can add more energy to the product so that the process can be repeated until the desired size and density of the carbon black particles are achieved.

In addition it is surprisingly found that when the feed stock is introduced centrally in the plasma torch so that the plasma torch surrounds the reactant it ensures that the reactant attains an even temperature and uniform decomposition conditions are maintained, resulting in uniform product quality. Further it means that the reactant will remain centrally in the reaction chamber during that phase of the reaction when the risk of forming deposit on the wall is at its greatest, thereby reducing the problem considerably.

It is also surprisingly found that it is important that the temperature of the feed stock is not too high when it leaves the lead-in tube. If the temperature of the feed stock exceeds a value of approximately 650° C. to 700° C. the decomposition will start too early, and even the lead-in tube can become fouled with coke. The lead-in tube is therefore normally temperature regulated.

In the invention the raw materials are supplied, viz. the hydrocarbons to a plasma torch, in whose active zone are created at least two reaction zones and where the process is divided into several stages. Thus the method according to the invention is a reaction process divided into stages in which the parameters for the individual zones will be capable or determining the quality of the products. In the first reaction zone of the process, the pyrolytic decomposition will be performed and particles of carbon will be primarily produced, macromolecules in the gas phase condensing into drops which hydrogenate into solid carbon. Thus the first decomposition is obtained here in the two main feed stocks which are of interest, viz. hydrogen and carbon black. The number of primary particles of carbon and the size of these can be controlled by means of temperature and pressure in this reaction zone. This is done by controlling the amount of hydrocarbon fed in in relation to the energy supply emitted by the torch or by controlling the residence time of the particles in the first reaction zone.

The quality of the carbon product as well as its properties will be determined by the further progress through the reaction zones. The finest quality is obtained when the products from the first reaction zone are exposed to quenching in the next reaction zone. The admixture of additional hydrocarbons in a secondary feed flow in the second reaction zone will lead to a growth in the particles which are created in zone 1. In this way a product is obtained with larger particles, higher density and smaller surface. The amount of admixture of hydrocarbons in any subsequent reaction zones will determine the size of the carbon particles. For the largest particles additional energy will be required which can be added by supplying C—H—O compounds in their reaction zones. Alternatively, the additional energy can be supplied by means of plasma torches located in these zones. Such alternatives and the supply of extra energy provide a control of the product quality.

It has been found that the method according to the invention provides a yield of carbon and hydrogen of almost 100% of the hydrocarbon and none of the products in the reaction process will be polluted. Furthermore, it has been possible to control the quality of the produced carbon black both with regard to the desired size, surface, density and acidity without affecting the purity of the decomposition products, while at the same time the method uses very little energy in relation to previously used production methods. This is due to the fact that it is possible to exploit exothermic decomposition energy, e.g. for the decomposition of extra raw material.

Methane has been chosen as the feed stock in the method according to the invention, but it will undoubtedly also be possible to use other forms of hydrocarbons and natural gases or components, thus enabling the method according to the invention to be used substantially for hydrocarbons.

It is assumed that the reaction path for the production of carbon black consists in the fact that those hydrocarbons produced by pyrolysis are first converted to acetylene (ethyne) and subsequent aromatic cores polymerise and form macromolecules, i.e. large molecules with a high molecular weight. These macromolecules become supersaturated, thereby condensing into drops of liquid which further pyrolyze the solid carbon molecule. Once drops of liquid have been formed it will no longer be possible to achieve supersaturation. This is due to the fact that the macromolecules which are formed will be adsorbed on those drops or pellets which are already formed. This adsorption will occur more rapidly than the formation of the macromolecules. In consequence the number of elementary particles which is formed is given and is only dependent on pressure, temperature and reactant. This forms the basis for controlling the quality of the created product. If, e.g., hydrocarbons are introduced into the area where drops of liquid have been formed, no new particles will be formed but the existing ones will grow. Hydrocarbons which are added here will form macromolecules which attach themselves to the particles which have already been formed.

The physical properties of the carbon produced will vary with the temperature. At higher temperatures the carbon black produced will be more airy. The pressure relations will also be significant in this connection. The quality is closely related to which molecules the macromolecules are composed of and how they are connected.

The apparatus for use in the method according to the invention comprises in principle a main plasma torch whose active area is located in a reaction chamber which may be equipped with pressure and temperature control devices and possibly additional torches. The chamber is equipped with an outlet for gas and carbon from which out-let a branch pipe leads to a heat exchanger with a return pipe to the plasma torch for recirculation of heat energy.

In the following section the method according to the invention will be illustrated in more detail by means of an embodiment and a drawing which illustrates purely schematically the principle for the construction of an apparatus according to the invention. In this connection it should be emphasized that the apparatus in the drawing is intended only as an illustration of the principle construction and is meant to elucidate the individual stages of the method according to the invention. For a person skilled in the art, this illustration will nevertheless also provide guidance in the construction of an apparatus according to the invention.

In the illustrated embodiment the raw material selected for use is the hydrocarbon which at present appears to be the most suitable for the process, namely methane.

The apparatus according to the invention therefore comprises in principle two main components, viz. a plasma torch which is indicated by A and the reaction chamber B. It should be obvious that this reaction chamber B can also be divided into several sections if this is considered expedient. Furthermore, at the end of the reaction chamber B which is remote from the plasma torch A there will be outlet means for the reaction products, which are indicated by the general reference designation C.

A plasma torch as schematically illustrated by A is described in more detail in the applicant's simultaneous U.S. Pat. No. 5,486,674 and its construction is therefore not described in more detail here. It will also be possible to use torches with a different construction.

Methane is introduced into the reactor chamber B through a lead-in tube 1. The lead-in tube 1 is preferably liquid-cooled and coated with an outer heat-insulating layer and is located coaxially in the internal electrode 2 in the tubular plasma torch A. The lead-in tube 1 can be moved in the axial direction for positioning of the nozzle in relation to the plasma zone. It is vital that the methane which is introduced through the lead-in tube 1 has a low temperature when it leaves the nozzle. If the temperature of the methane exceeds a value of approximately 650–700° C., the decomposition will start too early. This is undesirable because decomposition products can be formed inside the lead-in tube 1 before the methane reaches the plasma flame, thus causing precipitation of such products in the form of coke on the walls of the feed tube and on the plasma torch's electrodes. Thus it is essential for the product fed into the lead-in tube to receive a proper cooling in order to avoid this type of fouling.

The plasma torch A consists of tubular electrodes 2, 3, 4 wherein the innermost electrode 2 is supplied with electrical direct voltage with a polarity and wherein the two external electrodes are connected to opposite polarity. Each of the electrodes can be positioned independently of one another in the axial direction. All the electrodes are made of graphite and can be replaced during consumption so that the process remains continuous. It is an advantage for the electrodes to be made of graphite which is carbon. The electrodes will not pollute the process, but on the contrary will become an integral part of the process and the part which erodes will be converted in the process in the same way as the reactants. The electrodes can also be produced from carbon which is formed in the process and which is particularly free of polluting materials, thus making it self-supporting. In the lining of the reactor in the area where the arc from the plasma torch is burning, a magnetic coil 5 has been inserted connected to a separate power supply which makes it possible to adjust the magnetic field in the area where the arc is burning. In this way the arc's rotation rate can be controlled, while at the same time the arc can be extended in the longitudinal direction, i.e. from burning between the two innermost electrodes to burning between the innermost and the outermost electrodes. The plasma gas used is hydrogen, which can be produced in the process.

The plasma torch A with the lead-in tube 1 for hydrocarbons, methane in the example illustrated, is located at the entrance to the reaction chamber B where the inner walls are composed of graphite. Since the plasma torch A and the lead-in tube 1 can be moved in the axial direction, the volume and thereby the residence time and temperature can be controlled. The active area for this process is indicated by zone 1. In this first reaction zone the number of drops of liquid is determined. The temperature can also be controlled by the ratio of power to the plasma torch and the amount of methane. In zone 1, i.e. the first reaction zone, three of the stages take place in the method according to the invention, divided into three different areas. This can be described as follows: (the areas described below are indicated by Roman numerals in the FIGURE).

Area I

In this area unmixed methane is introduced at such a low temperature that in reality no reaction takes place here. The temperature is lower than 1000° C. At high feed rates some of the methane could pass without conversion to the next reaction zone, which is designated as zone 2 in the reactor chamber B. The methane begins to react at approximately 700° C., but at temperatures below 1000° C. the reaction rate is so low that the bulk of the material in the area I will not react. In the border area between area I and Roman numeral II the temperature is between 1000 and 1200° C.

Area II

Around area I lies the area for burning off the plasma gas, a process which takes place at an extremely high temperature. There are no reactions in this area.

Area III

Outside this plasma gas area is an area where mixing of methane and plasma gas takes place. As already mentioned the temperature of the plasma gas is extremely high but the temperature in the mixture is kept down due to the strong endothermic production of acetylene (ethyne). The temperature here will be between 1200 and 2000°. The lowest temperatures will be found in the central area of the reactor furthest away from the torch. Between the reactor wall and the area III it will be possible for drops of liquid which are formed to be precipitated on the wall before they are completely dehydrogenated. These drops can cause a hard coating to form on the reactor which is difficult to remove.

The product stream or feed stream from zone 1, which covers the areas I–III, determines the number of carbon particles based on temperature and pressure in this section and the air stream of carbon particles is passed on directly into the next zone, zone 2 in the reactor housing where the further reaction takes place. In the drawing the reaction areas are indicated as area IV.

Area IV

In this area the last remains of acetylene (ethyne) react to form carbon black and hydrogen.

The temperature here is between 1200 and 1600° C. In this area it is possible to add extra amounts of raw material, i.e. methane, in order to cool the product mixture by quenching with methane. This methane will cool down the product by itself reacting with carbon black and hydrogen.

Based on the theory that the number of carbon black particles is given, the carbon material produced in this part of the reactor will be deposited on already existing particles. These will thus grow larger, resulting in a product which is more compact. By adding more energy to the product by means of an oxygen-containing medium or extra plasma torches in zone 2, the process described for area IV can be repeated until the desired size and density of the product are achieved. This area can therefore be repeated with further subsequent areas, possibly in new sections of the reaction chamber B. The lead-in tube for additional amounts of methane and an oxygen-containing medium is indicated by 8 and is passed into zone 2. In addition the zone has the possibility for the connection of extra plasma torches (not illustrated in more detail).

That part of the reactor volume which lies outside these areas will normally be "dead volume". The "dead volume" will reduce the deposit of solid material on the reactor wall and is therefore desirable. Between areas III and IV there will be low axial velocity which can lead to a build-up of carbon material in this area. In this area a floor is almost formed in the reactor. The material will have a low mechanical strength and can easily be removed by mechanical means. High velocity through the reactor will also counteract such tendencies. A special design of the reactor helps to limit this type of fouling by causing liquid particles which are formed to be dehydrogenated before they hit the wall and form a hard coating. In order to prevent undesirable fouling from causing re-fouling and stoppage of the reactor, it is equipped with an internal mechanical scraping device which regularly scrapes down the walls of the reactor. The mechanical scraper can also be equipped with channels with internal washing down of the reactor walls with a suitable oxidation medium. In order to further increase the energy yield realized by the method, the methane can be heated by means of a heat exchange process obtaining heat from the product stream from the reactor chamber and thereby have a temperature of almost 700° C. when the methane is fed into the lead-in tube 1 or into zone 2 through the leading tubes 8.

In the above only one example of the method according to the invention and the principle sides of an apparatus according to the invention are described. As already mentioned there will be many possibilities for variations and for determination of quality and type of feed stock within the scope of the invention. This will also be dependent on the feed stock which is fed in. This is generally described as hydrocarbon and the preferred hydrocarbon to-day is methane. Alternatives could also be, e.g., chip material or shavings from the woodworking and cellulose industry, other oil products and natural gas in general. In connection with the invention it is also important for the method to be implemented without being affected by factors such as fouling of apparatus, etc. In this connection it can be expedient to incorporate the method which is described in the applicant's U.S. patent application Ser. No. 08/244,297 filed May 6, 1994.

We claim:

1. A method for decomposition of hydrocarbons for the production of hydrogen and carbon black using a reaction chamber having a plasma torch located adjacent one end thereof and an exit at the opposite end of the reaction chamber and inlets disposed about a portion of the reaction chamber for supplying a quenching fluid, said plasma torch including a lead-in tube, comprising the steps of feeding a hydrocarbon feedstock through a lead-in tube of the plasma torch while controlling the temperature of the lead-in tube so that the feedstock will have a temperature within the range of 650° C. to 700° C., subjecting the feedstock to a first uniform heating by means of a plasma generated by the plasma torch, feeding the feedstock and a plasma hydrogen gas for forming a plasma at respective pressures to cause mixing of said feedstock and hydrogen gas in an area immediately beyond the hydrogen plasma at a temperature above 1600° C. to cause decomposition of the feedstock and the generation of free hydrogen and dehydrogenated carbon material, which material passes to a further zone of the reaction chamber at a temperature between 1200° C. and 1600° C. where final and complete decomposition of the hydrocarbons of the feed stock to carbon black and hydrogen is performed and including the further step of adding a quenching fluid to said further zone, said quenching fluid comprising a hydrocarbon material which reacts with the already produced carbon black to thereby increase the particle size, density and quantity without the consumption of further energy, and subsequently discharging and separating the reaction products and passing any hot gas generated through a return pipe to the plasma torch.

2. The method as claimed in claim 1 wherein said reaction chamber is provided with additional plasma torches adjacent the further zone and including the step of operating said additional plasma torches to maintain the temperature in said further zone at approximately 1200 to 1600° C.

3. A method according to claim 1, wherein a material containing carbon, hydrogen and oxygen is added to at least one of said zones to thereby increase the size of carbon black particles produced.

4. A method according to claim 1, wherein said hydrocarbon feedstock comprises methane.

5. A method according to claim 1, wherein said step of controlling the temperature of said lead-in tube is conducted using a liquid.

* * * * *